Figure 1:
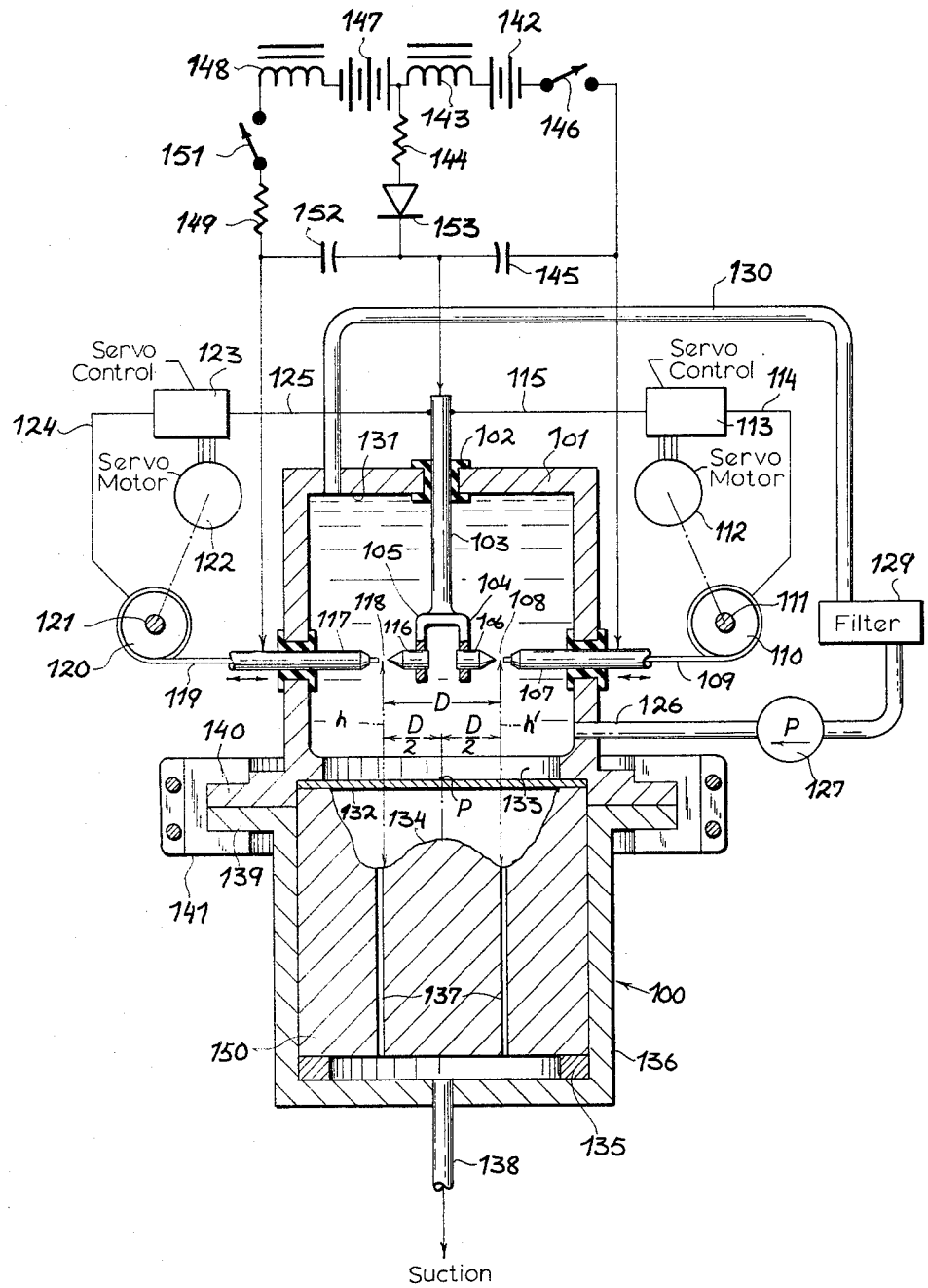

KIYOSHI INOUE
INVENTOR.

BY Karl S. Ross
AGENT

3,232,086
SPARK PRESSURE SHAPING
Kiyoshi Inoue, 182 3-Chome, Tamagawayoga Machi,
Setagaya-ku, Tokyo, Japan
Filed Dec. 9, 1963, Ser. No. 329,195
Claims priority, application Japan, Dec. 7, 1962,
37/55,508; Feb. 22, 1963, 38/7,668
16 Claims. (Cl. 72—56)

My present invention relates to the shaping of metallic and nonmetallic bodies in a plastically deformable state by impulsive pressures derived from spark discharge. This application is a continuation-in-part of my copending application, Serial No. 311,061 filed September 24, 1963 as a continuation of my earlier applications Serial Nos. 41,080; 92,284; 104,758 and 247,387 filed July 6, 1960; February 28, 1961; April 21, 1962; and December 26, 1962, respectively.

In my copending application Serial No. 311,061, I have pointed out that it is possible to develop, in a closed vessel containing a liquid medium, an impulsive or momentary shock wave which can be transferred with high efficiency to a workpiece in order to shape or deform the latter or to cause its bonding to other discrete bodies in contact with the workpiece. The distinctions between this method and earlier techniques wherein so-called "shock tubes" are used will be immediately apparent when it is noted that the shock tubes of the conventional type generally make use of ionized gases to transfer kinetic energy to unionized gas particles and to thus propagate a perturbation wave or disturbance in the gaseous medium. The inherent elasticity of a gaseous medium and the particular limitations of such devices have limited their use for machining applications, it being highly difficult to control the shock waves and to exploit efficiently the energy thereof. In accordance with the principles of the present invention, which is an extension of the system and methods set forth in my earlier applications mentioned above, the disadvantages of conventional systems can be avoided when an impulsive spark discharge is generated in a liquid in a substantially closed system with the liquid medium employed to transfer energy via the resulting pressure wave to the workpiece. In this connection, it may be pointed out that I have discovered that most efficient results can be obtained when the impulsive discharge is produced in a liquid medium in force-transmitting relationship with the workpiece by passing an electric current through a conductor disposed in the liquid medium sufficient to develop an electric discharge at this conductor to produce the shock wave. It is believed that, to a large extent, the shock wave results from ionization of the electric material and the liquid in the region of the discharge whereby the ionized particles transfer kinetic energy to atoms or molecules of the liquid medium, the kinetic energy increase of these particles resulting partly from electrostatic effects of ionization: reaction forces arising from the expulsion of an electron from an atom or an ionized particle upon a molecular or atomic collision; thermal increase in the velocity of the particles; magnetic forces acting upon charged particles and the vaporization liquid or electrode material; and mechanical compression of the liquid medium.

In the copending application Serial No. 311,061 mentioned above, a movable member constitutes one wall of the chamber confining the liquid medium and the energy-receiving surface against which the shock wave traversing this medium is applied. This movable member can be a piston in force-transmitting relationship with a workpiece externally of the chamber or may be constituted by the workpiece itself for shaping the latter to conform, for example, to the contours of a mold or die. It has been found to be important to provide this movable member with a working face generally parallel to the discharge gap since the wave front of the pressure wave is not truly spherical but rather has a maximum amplitude in a plane perpendicular to the arc or spark gap with the predominant pressure wave being of circular configuration. Among the other important principles of this latter application, which is reviewed herein as applicable to the features of the present invention, are the use of relatively sharp-pointed or slender electrodes in the region of the spark gap so that initially a portion of the electrode system fuses to provide an increasing gap across which the discharge is sustained; the insurance during the discharge process of a continuous circulation of the dielectric medium so that any electrode detritus and any developed gases are swept away from the region of the spark gap while the liquid composition in the region thereof is maintained substantially constant; and kinetic rebound within the liquid medium is minimized (e.g. by mutual movement of the die and the workpiece or piston). Further increases in efficiency were obtained when the liquid chamber had a generally concave configuration to reflect the pressure wave in the direction of the workpiece and when a vibratile member was disposed between the piston and the workpiece.

It is important to note that this development enables the die forging of metallic bodies without generation of the usual forging shock-wave heat which rapidly deteriorates the conventional die surfaces.

It is the principal object of the present invention to provide a method of shaping a body with the aid of impulsive discharge in such a manner as to enable the formation of larger bodies than is possible with the systems disclosed in my earlier applications described above.

A more specific object of this invention is to extend the principles of these earlier applications to the forming of intricate configurations with high accuracy and efficiency by the use of impulsive spark discharge.

These objects, and others which will become apparent hereinafter, are attained in accordance with the present invention by a method of shaping a body which comprises the steps of disposing an electrode means within a substantially closed pressure vessel having a movable member which can constitute the workpiece, forming a wall of this vessel juxtaposed with the electrode means and triggering an interrupted discharge within the vessel to provide a succession (i.e. at least two) discharges with their respective shock waves to deform the workpiece in stages. This method permits the highly accurate shaping of workpieces which are too thick to be deformed by single discharge or extend over an area so large that a single discharge will result in complete deformation of the workpiece in one region but incomplete deformation in another region. According to a more particular feature of this invention, a workpiece can be shaped to conform to the contours of a relatively deep die by an electrode means constituted of a plurality of confronting electrode portions each of which is adapted to sustain a spark discharge and which are energized more or less successively to generate a high-rate repetition of shock pulses. For deep dies, the successive electrode portions can be arranged in the direction of propagation of the shock wave toward the movable member; this results in a concentration of the shock forces. Alternatively, the electrode portions may be spaced in a direction transverse to the direction of propagation of the shock wave in order to deform the workpiece progressively over a wide area. In this case the shock waves, whether triggered successively or simultaneously, do not tend generally to interfere with one another.

Advantageously, the workpiece can be a plate juxtaposed with a die cavity and can be in force-transmitting relationship with the medium so that the successive shock wave progressively deform the plate into this cavity. Under these circumstances, the spaced-part pairs of electrode surfaces respectively define discharge gaps lying along lines perpendicular to the energy-receiving surfaces of the vessel and extending through relatively deep portions of the die cavity, the region between the electrode gaps corresponding to a relatively shallow portion of the die cavity. So that the shock waves from each pair of electrode surfaces are more or less additive in effect, it is desirable to initiate each electrical discharge prior to the decay of the shock wave resulting from the previous discharge. This can be assured when the distance between the discharge gap and the energy-receiving surface and the delay between discharges is selected so that the delay is less than or just equal to the period required for propagation of the shock wave from the discharge gap to the energy-receiving surface. I have found that great precision can be obtained when the energy of the discharge produced at each pair of electrode surfaces varies in accordance with the depth of the die at the corresponding location. Thus it is an important feature of the present invention to provide power means for successively energizing the electrode surfaces whereby the energy of the discharge differs at each pair of such surfaces. Consequently, it is proposed in accordance with the present invention, to provide power means which includes a respective capacitor connected across the electrode surfaces of each pair and circuit means for energizing these capacitors to different degrees.

When the electrode surfaces are, according to the instant invention, spaced in the direction of propagation of the shock wave for additive effect, I have found that best results are obtained when each pair of electrode surfaces of greater proximity to the energy-receiving surfaces is energized with a progressively diminished potential and the electrode means is constituted by a pair of spaced-apart rods extending generally in the direction of the energy-receiving surfaces when the electrode surfaces are spaced along at least one of these rods and insulated one from another. Under these conditions, a magnetic field is found to develop around the rods with circular lines of force surrounding each rod and effective to direct the shock-wave energy due to ionized particles toward the energy-receiving surface. It has been observed, in this connection, that the spark bridging the electrode surfaces tends to be convex in the direction of the energy-receiving surfaces, as a consequence of this magnetic field, rather than parallel to this surface. A high efficiency of force transmission thus results.

Figure 2:
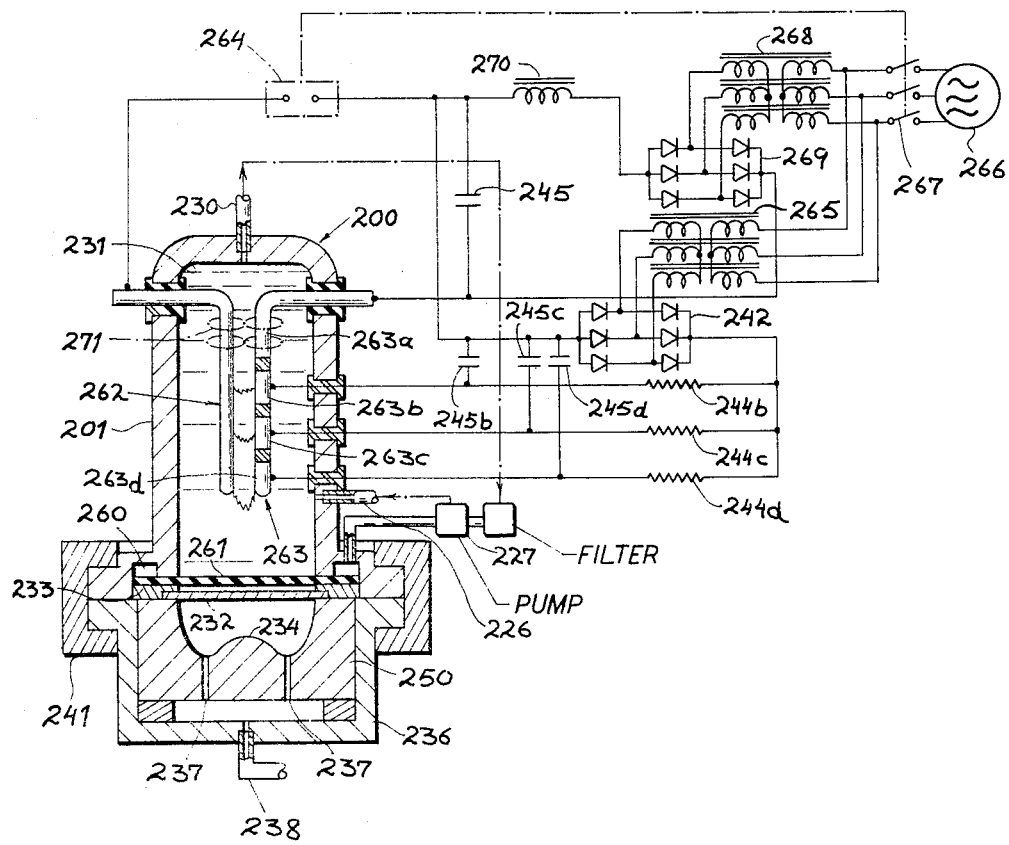

The above and other objects, features and advantages of the present invention will become more readily apparent from the following description, reference being made to the accompanying drawing in which;

FIG. 1 is an axial cross-sectional view through an apparatus for carrying out the method of the present invention, showing schematically the circuit means for energizing the electrodes; and FIG. 2 is a view similar to FIG. 1 of another embodiment of this invention.

In FIG. 1 I show a device 100 for the die forming of a sheet-metal body 132, the device comprising a closed fluid receptacle 101 containing a dielectric liquid (e.g. kerosene, glycerol or transformer oil) in which the pressure wave is developed; the receptacle 101 is provided with an angular flange 140 in abutting relationship with a similar flange 139 of the lower housing portion 136, the flanges being interconnected by a bipartite clamp 141. The chamber 131 of receptacle 101 contains the dielectric liquid which is continuously circulated past the electrodes by a pump 127, the liquid being fed into the chamber by an inlet pipe 126 and led from there via conduit 130. The discharge pipe 130 is connected to a filter 129 where foreign material is removed from the dielectric liquid so as to maintain its composition substantially constant in accordance with the principles of my application Serial No. 311,061.

An insulating bushing 102 slidably receives a bar 103 whose bifurcated end within the vessel is formed with arms 104, 105 in which are mounted the relatively massive electrodes 106, 116; these electrodes form with the respective counterelectrodes 107, 117 a pair of spaced-apart discharge gaps 108, 118, respectively aligned with relatively deep portions of the die cavity 134 of a die 150. The electrodes 107, 117 are provided with fusible central wires 109, 119 adapted to melt away upon the passage of electrical current between the electrodes to increase the width of the spark gap during the course of the discharge. Wires 109, 119 are fed progressively into the respective spark gaps from coils 110, 120 by respective servomotors 112, 122 which drive the shafts 111, 121 of these coils. Each of the servomotors is provided with the usual servo-control system 113, 123, responsive to the gap voltage to re-establish the proper gap size after each discharge. The control circuits 113 are connected across the respective electrodes by leads 114, 115 and 124, 125.

To adjust the distance between the spark gap and the energy-receiving surface of the workpiece 132, bar 103 is shiftable within the housing 101. The electrode bodies 107, 117 are also displaceable in a plane parallel to the energy-receiving surface so as to locate the respective gaps 108, 118 in line with the deepest portions of the die cavity 134. A flange 132 of housing portion 101 retains the workpiece 132 in place on the die 150. The latter is provided with bores 137 for evacuating the die cavity 134, these bores opening into a compartment defined by the die 150 and housing portion 136 from which the die is spaced by a ring 135. A conduit 138 connected to a reduced-pressure source evacuates this compartment.

The power means for the electrodes includes a battery 142 connected in series with a pulse-shaping choke 143 and a resistor 144 across a discharge capacitor 145 in circuit with a switch 146. Capacitor 145 discharges across the electrodes 106, 107 to generate a spark discharge between this pair of confronting electrode surfaces. A similar capacitor 152 is connected across electrodes 116, 117 and discharged via a resistor 149 by a battery 147, a choke 148 and a switch 151, resistor 149 representing a circuit means for charging the capacitor 152 at a lower rate so that its discharge is of reduced intensity as compared with the discharge of capacitor 145. The difference in spark energy corresponds to the difference in distances $h$, $h'$ between the gaps 118, 108 and the corresponding portions of the die cavity 134. The rectifier 153 prevents undesirable discharge of capacitor 152 through resistor 144. When switches 146 and 151 are closed, spark discharges are successively developed at gaps 108, 118 to progressively deform the plate 132 into the die cavity 134, the shock waves of highest intensity being located in line with the deepest portion of the die cavity. Since the shock waves do overlap at an intermediate location P of the body 132 will receive a contribution from each of the shock waves, the distance D between the gaps 108, 118 and the intensities of the discharges being selected such that the pressure at point P is sufficient to deform the body in this region against the die but not excessive. For optimum results, it is frequently desirable that the spark gaps be offset by identical distances D/2 from the shallowest portion of the die cavity. Servo-motors 112, 122 maintain the desired spark gap, the function of the device being otherwise as set forth in my copending application Serial No. 311,061.

In FIG. 2, I show a modification of the device of FIG. 1, wherein the housing 200 is again provided with an outlet 230 and an inlet 226 for the circulation of the liquid dielectric through the pressure chamber 231 by a pump 227, the latter also applying pressure to an angular compartment 260 in order to seal a flexible diaphragm 261, forming the energy-receiving surface, against a ring 233 which also holds the workpiece 232 in place upon the die 250. The die cavity 234 is provided with bores 237 for the evacuation of air from the cavity by a conduit 238 in the manner previously described. Lower housing portion 236 is secured to the upper housing portion 201 by a clamp 241. The electrode means of this embodiment, however, includes a pair of spaced apart rods 262, 263, the latter being subdivided into sections 263a, 263b, 263c and 263d. These sections form respective surfaces of electrode pairs with the confronting surfaces of rod 263, the rods 262 and 263 diverging toward the energy-receiving surface 261.

The power means for this apparatus includes a main capacitor 245 connected across the electrode pair of portion 263a in circuit with a spark gap 264 while electrode surfaces 263b through 263d are energized by respective capacitors 245b, 245c, 245d in charging circuits with resistors 244b, 244c, 244d of successively increasing resistance. The capacitors 245b through 245d are charged via a rectifier bridge 242 in circuit with a power transformer 265, energized by source 266 in series with a ganged switch 267 operated in accordance with the development of a spark at the gap 264. The switch also energizes a variable transformer 268 whose rectifier bridge 269 charges capacitor 245 via choke 270.

In operation, switch 22 is closed and capacitor 24 charged until spark gap 264 breaks down whereupon a discharge develops at electrode portion 263a which is brought to a relatively high potential. The magnetic field developed around the rods 262, 263 and diagrammatically shown at 271 serves to propagate the ionization disturbances in the direction of the energy-receiving surfaces so that the successive discharges of capacitors 245b through 245d produce a succession of shock waves impinging upon the energy-receiving 261 to deform the workpiece 232. Since the magnetic field not only causes a preferential shift in the shock wave in the direction of the energy-receiving surface and ensures a convex discharge but also propagates the ionization particles in the direction of this surface, the potential at each of the electrode surfaces successively closer to the workpiece can be made less and the spark gap increased.

*Example*

In the apparatus FIG. 2, utilizing a die having a depth of 50 mm. and a diameter of 26 mm. an aluminum workpiece having a thickness of 2.5 mm. is deformed using a total discharge energy of 5000 joules. The spark gap at portion 263a was 2 mm. with a discharge potential of 36,000 volts while the spacing at portions 263b through 263d was 2.5, 3 and 3.5 mm. with potentials of 30,000, 24,000 and 18,000 volts respectively. The dielectric liquid was glycerine which was maintained at a pressure of 5 kg. per cm.² while the deformation was completed with a single succession of discharges, each spark having a duration of about 150 to 200 micro-seconds. The accuracy of the forming was found to be 25% greater than that possible with a single discharge. The length of the electrodes was approximately 50 mm. with a gap of about 15 mm. between the ends of the rods 262, 263 and the energy-receiving surfaces.

The invention described and illustrated is believed to admit of many modifications within the ability of persons skilled in the art, all such modifications being considered within the spirit and scope of the appended claims.

What is claimed is:

1. In a method of shaping a body wherein a substantially closed pressure vessel which is filled with a dielectric liquid medium and said vessel has at least one energy-receiving surface for transferring shock pressure within said liquid medium to said body, the improvement which comprises the steps of:
    disposing at least two spaced pairs of electrode surfaces within said medium in said vessel; and
    successively energizing said pairs of electrode surfaces to generate respective spark discharges in succession within said medium, said discharges producing respective shock waves for progressively deforming said body.

2. The improvement defined in claim 1 wherein said pairs of electrode surfaces are spaced apart in a direction generally transverse to said energy-receiving surface and in the major direction of propagation of said shock waves, the pairs of said electrode surfaces progressively closer to said energy-receiving surface being energized in succession.

3. The improvement defined in claim 2 wherein said electrode surfaces are formed as a pair of spaced apart elongated rods extending generally transversely to said energy-receiving surface for generating a magnetic field between said rods propagating said discharges in the direction of said energy-receiving surfaces.

4. The improvement defined in claim 3 wherein the electrical potential applied to said pairs of electrode surfaces is diminished with the proximity of said pairs of electrode surfaces to said energy-receiving surface.

5. The improvement defined in claim 4 wherein the spacing between the electrode surfaces of each pair thereof increases with proximity of the pair of electrode surfaces to said energy-receiving surface.

6. In a method of shaping a body wherein a substantially closed pressure vessel is filled with a dielectric liquid medium and said body has at least one energy-receiving surface for transferring shock pressure within said liquid medium to said body, the improvement which comprises the steps of:
    disposing at least two spaced pairs of electrode surfaces within said medium in said vessel; and
    successively energizing said pairs of electrode surfaces to generate respective spark discharges in succession within said medium, said discharges producing respective shock waves for progressively deforming said body, said pairs of electrode surfaces being spaced apart in a direction parallel to said energy-receiving surface and transversely to the major direction of propagation of said shock waves.

7. The improvement defined in claim 6 wherein said body is a plate having a major dimension parallel to said energy-receiving surface and a contoured die is disposed adjacent said body remote from said energy-receiving surface, further comprising the steps of effecting said spark discharges at locations within said vessel lying along respective lines perpendicular to said energy-receiving surface at relatively deep portions of said die.

8. The improvement defined in claim 7 whereby the intensity of said discharges are proportional to the depth of said die along said lines.

9. The improvement defined in claim 7 wherein said succession of discharges is repeated.

10. In an apparatus for the shaping of a body, wherein a substantially closed pressure vessel contains a dielectric liquid medium and has an energy-receiving surface for transferring shock waves in said medium to said body, the improvement which comprises:
    at least two spaced-apart pairs of juxtaposed electrode surfaces within said medium in said vessel; and
    power means for successively energizing said pairs of electrode surfaces to generate respective spark discharges in succession within said medium and produce respective shock waves propagated in the direction of said energy-receiving surface.

11. The improvement defined in claim 10 wherein said pairs of electrode surfaces are spaced apart transversely of said energy-receiving surface.

12. The improvement defined in claim 11 wherein said electrode surfaces are constituted as a pair of spaced apart elongated rods extending generally in said direction.

13. The improvement defined in claim 12 wherein said power means includes circuit means for applying successively diminished electrical potentials to the pairs of electrode surfaces successively closed to said energy-receiving surface.

14. The improvement defined in claim 13 wherein the spacing between the electrode surfaces of each pair thereof increases with proximity of the pair of electrode surfaces to said energy-receiving surface.

15. The improvement defined in claim 10 wherein said power means includes a respective capacitor connected across the electrode surfaces of each pair and respective circuit means for charging said capacitors at different rates.

16. In an apparatus for the shaping of a body, wherein a substantially closed pressure vessel contains a dielectric liquid medium and wherein said body includes an energy-receiving surface for transferring shock waves in said medium to said body, the improvement which comprises:
at least two spaced-apart pairs of juxtaposed electrode surfaces within said medium in said vessel; and
power means for successively energizing said pairs of electrode surfaces to generate respective spark discharges in succession within said medium and produce respective shock waves propagated in the direction of said energy-receiving surface, said pairs of electrode surfaces being spaced apart in a direction parallel to said energy-receiving surface and transversely to said direction of propagation.

References Cited by the Examiner

UNITED STATES PATENTS

| | | | |
|---|---|---|---|
| 2,559,227 | 7/1951 | Rieber | 113—44 |
| 3,007,133 | 10/1961 | Padberg | 340—12 |

OTHER REFERENCES

"Explosives Form Space-Age Shapes," Steel for August 25, 1958; pages 82–89.

"Hydrospark Forming Shapes Space-Age Metals," The Tool Engineer, March 1960; pages 81–86.

CHARLES W. LANHAM, *Primary Examiner.*

WILLIAM J. STEPHENSON, *Examiner.*